United States Patent [19]

Baujat et al.

[11] Patent Number: 4,788,032

[45] Date of Patent: Nov. 29, 1988

[54] NUCLEAR REACTOR WITH FLOW GUIDANCE IN THE UPPER INTERNALS

[75] Inventors: Jacques Baujat, Versailles; Guy Desfontaines, Puteaux; Alain Heuze, Paris, all of France

[73] Assignee: Framatome, Courbevoie, France

[21] Appl. No.: 32,691

[22] Filed: Apr. 1, 1987

[30] Foreign Application Priority Data

Apr. 1, 1986 [FR] France .................................. 86 04594

[51] Int. Cl.[4] ............................................ G21C 15/00
[52] U.S. Cl. .................................... 376/352; 376/399
[58] Field of Search ............... 376/352, 353, 399, 389, 376/377, 209

[56] References Cited

U.S. PATENT DOCUMENTS

| | | | |
|---|---|---|---|
| 3,481,832 | 12/1969 | Rickert | 376/399 |
| 4,289,291 | 9/1981 | Goddard | 376/399 |
| 4,537,891 | 12/1985 | Gibbons et al. | 376/399 |
| 4,659,539 | 4/1987 | Kimbrell et al. | 376/399 |
| 4,681,728 | 7/1987 | Veronesi et al. | 376/209 |

FOREIGN PATENT DOCUMENTS

| | | | |
|---|---|---|---|
| 0125325 | 11/1984 | European Pat. Off. | 376/399 |
| 0125326 | 11/1984 | European Pat. Off. | 376/399 |
| 1473406 | 3/1967 | France | 376/352 |
| 2399714 | 9/1979 | France | 376/377 |
| 2140606 | 11/1984 | United Kingdom | 376/352 |

OTHER PUBLICATIONS

EPRI NP-1015, vol. 2, Feb. 1979, pp. 2-63, 2-65, 2-67, 2-68, 2-69, 2-71, 2-73, 2-75, 2-77, 2-79.

*Primary Examiner*—Harvey E. Behrend
*Attorney, Agent, or Firm*—Pollock, Vande Sande & Priddy

[57] ABSTRACT

A nuclear reactor has a pressure resistant vertical vessel with inlet and outlet pipes situated at the same horizontal level. It also includes internals having a barrel supporting the core and defining with the vessel a down flow path for the coolant from the inlet pipes towards a space under the core and upper internals defining a flow path for the coolant leaving the core, above this latter, and flowing towards the outlet pipes. The upper internals include dividing walls defining circumferentially distributed volumes located at the common level of the pipes and each over a different angular sector. Some volumes belong to the initial part of the downgoing coolant path and the others force part at least of the coolant leaving the core to follow a path which is successively directed upwardly then curving towards the outlet pipes. The invention is particularly suitable for use in pressurized water reactors.

8 Claims, 5 Drawing Sheets

NUCLEAR REACTOR WITH FLOW GUIDANCE IN THE UPPER INTERNALS

BACKGROUND OF THE INVENTION

1. Technical field

The invention relates to nuclear reactors cooled by a pressurized liquid of the type having a pressure resistant vessel with inlet and outlet pipes situated substantially at the same level, above the core, and internals having a casing supporting the core and defining with the vessel a down flow coolant path from the inlet pipes to a space situated under the core and an upper internal equipment defining a path for the coolant which flows upwardly out of the core towards the outlet pipes.

2. Prior Art

FIG. 1 is a simplified representation of internals widely used at the present time in PWRs. The reactor includes a vessel 10 closed by a cover 12 for defining a pressurized volume containing the core of the reactor. The core is formed of fuel assemblies 14, two of which are shown schematically, disposed vertically and side by side. The core of the reactor is carried by lower internals formed by a basket-shaped structure. The lower internals include a bottom plate 16 also called "core support plate", a cylindrical barrel 18 and a flange 20 bearing on an internal shoulder of the vessel. A dividing structure 21 is interposed between the periphery of the core (which has a polygonal crosssection) and the barrel 18. The upper internals located above the core include an upper core plate 22, situated just above the core, which indexes the fuel assemblies 14 and holds them in position.

The upper internals further include a support plate 24 connected to plate 22, by control cluster guide tubes 26 in the illustrated embodiment. In other cases, plates 22 and 24 are joined together by spacers. The support plate 24 is fixed to the vessel; as illustrated, plate 24 and flange 20 are clamped between vessel 10 and cover 12.

The cluster guides 26 are situated above fuel assemblies 14 constructed to receive control clusters (not shown) movable vertically by shafts which pass through the cover through penetration sleeves 28.

The lower internal equipments direct the pressurized water which enters the vessel through inlet pipes 30 down into the annular space between vessel 10 and barrel 18. The pressurized water thus arrives in the space situated below plate 16. It flows into the fuel assemblies 14 of the core through openings 32 in the bottom plate, upwardly through the core radially inwardly of the partitioning 21 and through the upper core plate 22 to reach the upper internals. The cluster guides 26 protect the control clusters, when they are raised, against forces induced by the water flow leaving the core. The water flow is initially vertically upwards, then deflected within the upper internals and it leaves barrel 18 through outlet nozzles 34 placed in alignment with outlet pipes 36 carried by the vessel. The outlet nozzles 34 are fitted to pipes 36 so that a gap exists when the reactor is cold for inserting or withdrawing the lower internals into and out of the vessel. Differential thermal expansion between the carbon steel vessel 10 and the stainless steel barrel 18 closes the gap and reduces the flow by-passing the core to a very low value when the reactor is at its operating temperature.

The lifting forces exerted on the fuel assemblies by the rising flow of pressurized water in the core are taken by the upper core plate 22 which transfers them to the support plate 24 in abutment against cover 12.

The arrangement which has just been described is well known and widely used. It has the drawback that the cluster guides 26, and especially those which are adjacent the outlet nozzles 34, are subjected, over substantially the whole of their length, to a radially deflected pressurized water flow and so to high forces. The transverse flow may cause vibratory movements of the cluster guides, and the transverse flow through the guide network is accompanied by high pressure losses.

The above drawbacks are all the more serious when a large number of clusters and of guides 26 are used and when the distribution pitch of the fuel assemblies is tight. For better use of the fissile material, future reactors will have, in addition to the control clusters, clusters having other functions, for example varying the neutron energy spectrum. The substitution contemplated of the present square shaped assemblies with assemblies distributed in a triangular pattern, having a tighter array of fuel rods, is likely to further increase the number of cluster guides required.

Different solutions may be envisaged for attenuating the above drawbacks, using several different approaches. A possible approach consists in locating a perforated shroud between the barrel 18 and the set of cluster guides. The water flow towards the annular space between the shroud and the casing provided with the nozzles is then distributed among all the holes and the maximum speed is reduced between the guides. That arrangement (European Pat. No. 125,325) increases the diameter of the vessel. In addition, should a break in the primary circuit occur, the pressure loss which the flow undergoes on passing through the restriction represented by openings in the shroud opposes the pressure balancing and increases the mechanical stresses.

Another possible approach consists in rendering the flow vertical in the zone occupied by the cluster guides. Different modifications of the arrangement of FIG. 1 allow this result to be attained. A first solution (U.S. Pat. No. 3,366,546) consists in placing, around the set of cluster guides, a shroud which is formed with holes in its upper part only. Again, the arrangement requires increasing the diameter of the vessel. A further solution consists in placing the outlet pipes of the vessel above the inlet pipes and in placing, between the two sets of pipes, a cylindrical ring connecting the casing to the vessel. The outlet pipes may then be above the level of the guides so that flow deflection takes place above the latter. This arrangement requires lengthening the vessel of the reactor. In addition, it makes it more difficult to "flood" the core again upon rupture of the hot leg of the primary circuit (i.e. the leg connected to the outlet pipe) by injecting water arriving through the inlet pipe, due to the high loss of motive power.

SUMMARY OF THE INVENTION

It is an object of the invention to provide a nuclear reactor of the above-defined type in which the radial component of the flow in the zone occupied by the cluster guides is appreciably reduced, in particular in the lower part of the guides, without increase of the diameter of length of the vessel as compared with a current reactor and while keeping inlet and outlet pipes at the same level.

To this end, there is provided a reactor wherein the upper internals include dividing walls or baffle means defining, circumferentially and at the common horizontal level of the pipes, volumes each occupying a given angular sector about the vertical axis of the reactor and some of which belong to the initial part of the downward coolant path whereas the others force part at least of the coolant leaving the core to follow an axially upward path before it bends radially outwardly towards the outlet pipes.

In a particular embodiment, the upper internals include control cluster guides placed above the core and receiving the flow leaving the fuel assemblies, said dividing walls guiding the flow upwards as far as radial flow passages towards said volumes forming a radial and downward return path towards the outlet pipes.

The upper internals may include an upper core plate connected by guides to a support plate fixed to the vessel and the barrel is connected to the vessel substantially sealingly, above the level of the pipes. Dividing walls having circumferential sections situated at a level higher than the pipes, circumferential sections situated at a lower level, and connecting sections define alternate volumes communicating some with outlet pipes and the others with inlet pipes, those of the volumes which communicate with the outlet pipes being also connected to the upper part of the space defined by the barrel.

The invention will be better understood from the following description of particular embodiments of the invention, given by way of examples.

BRIEF DESCRIPTON OF THE DRAWINGS

FIG. 1, already mentioned, is a vertical sectional view showing in a simplified way the internal arrangement of a conventional pressurized light water reactor;

FIG. 2, similar to FIG. 1, shows a first embodiment of the invention;

FIG. 2A is a detail view showing, in a developed view, a fraction of the dividing walls of FIG. 2, with additional ducting;

FIGS. 3 and 4, similar to the top part of FIG. 2, show two constructional modifications;

FIG. 5 is a perspective view, with parts cut away, showing a fraction of the upper internals of FIG. 4, and FIG. 6, similar to FIGS. 3 and 4, shows yet another constructional modification.

DETAILED DESCRIPTION OF PREFERRED EMBODIMENTS

Figure 1:
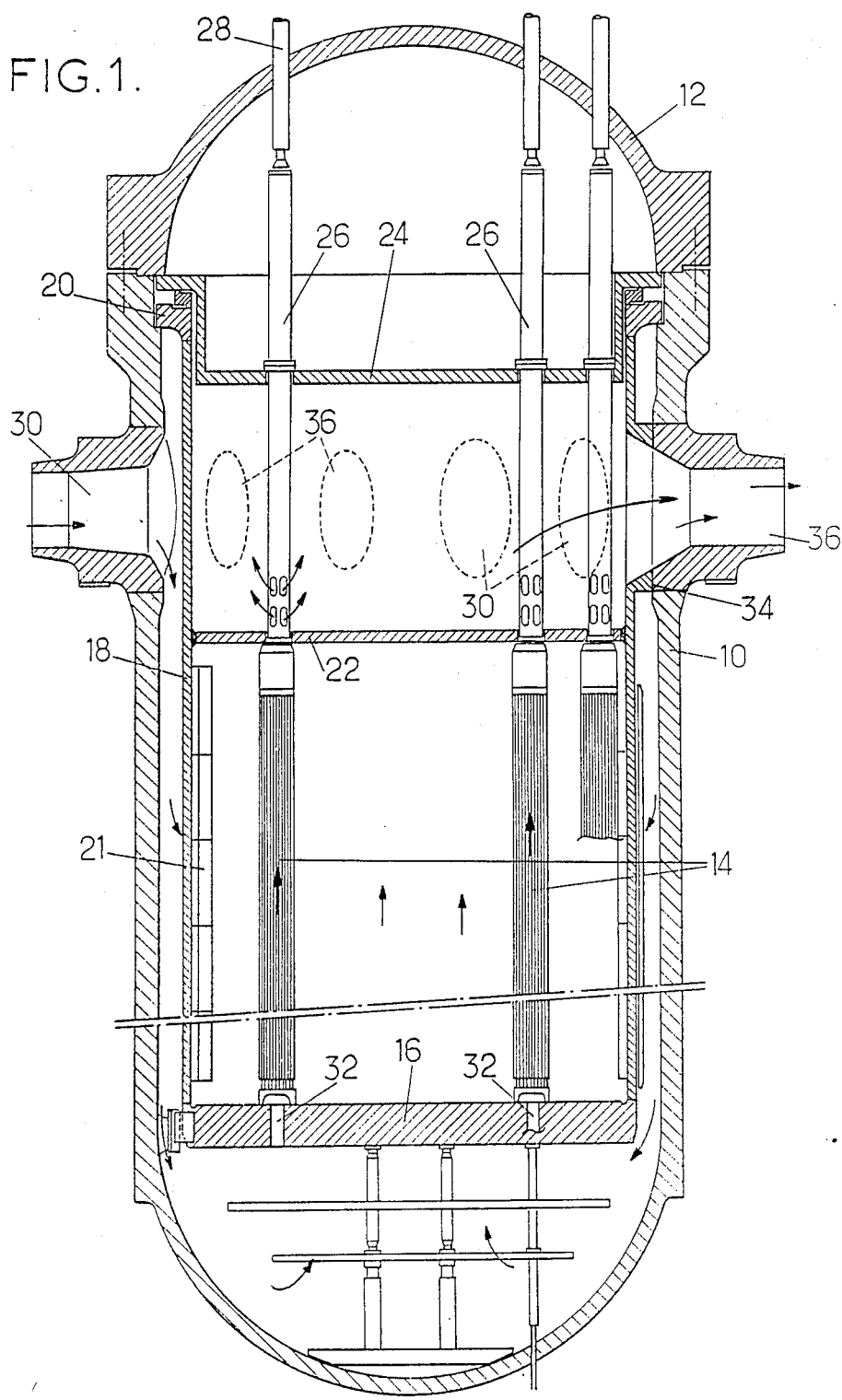
Figure 2:
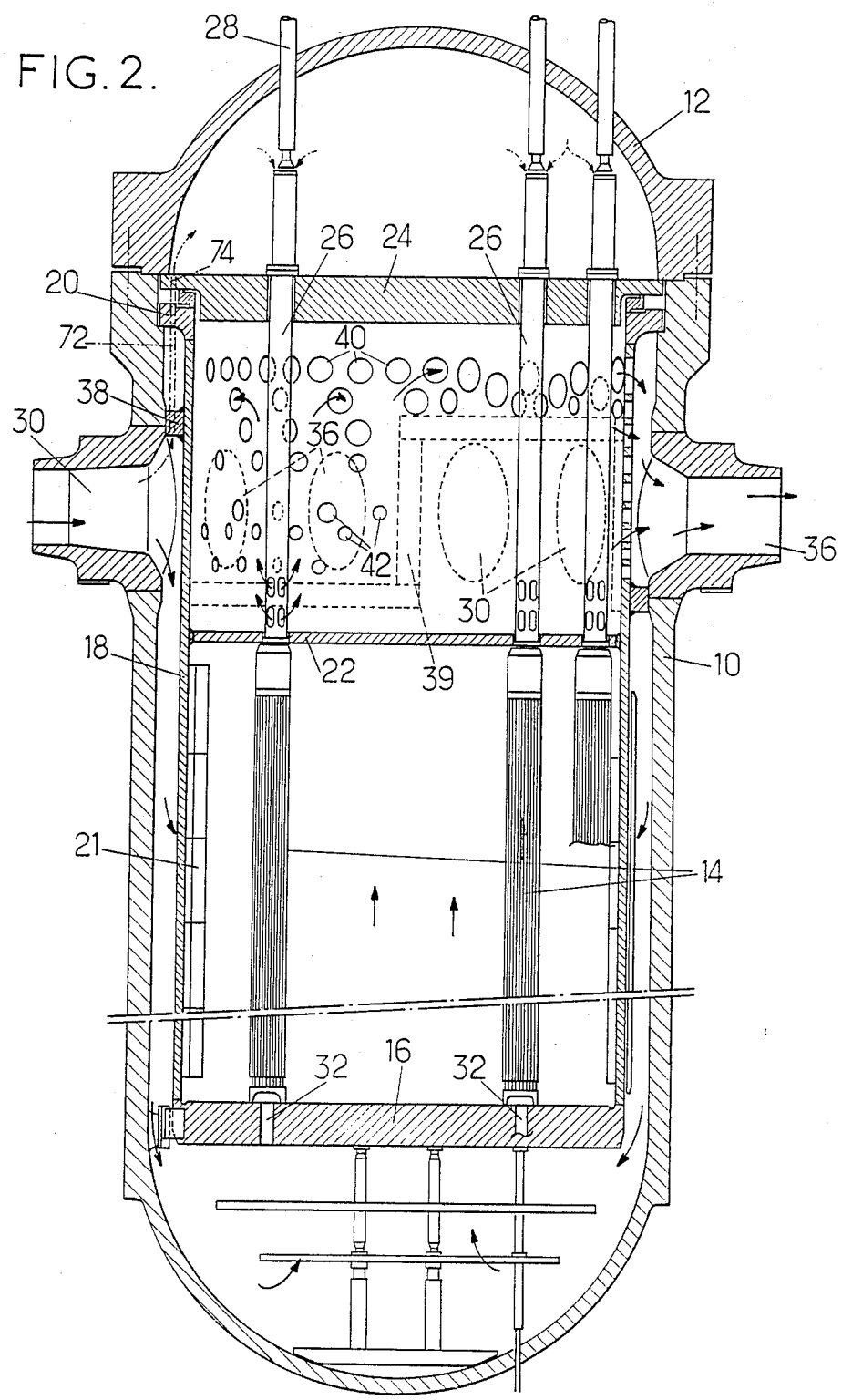

Referring to FIG. 2, a reactor has a general construction similar to that already shown in FIG. 1 and the corresponding parts are designated by the same reference numbers in the two figures. But the reactor of FIG. 2 includes means defining, between vessel 10 and the barrel 18, an annular space which is partitioned so as to cause the water which arrives through the inlet pipes 30 to flow down through the annular space, and the major part of the water which leaves the core to rise through the upper internals, then to flow down towards the outlet pipes 36.

In FIG. 2, the partitioning means are fixed to a barrel or casing 18 whose construction is the same as in FIG. 1, except that it has no nozzles and is formed with a network of openings whose arrangement will be described hereunder. Barrel 18 is connected to dividing wall means forming a crenelated barrier 38. This barrier 38 is formed by shaped bar sections fixed sealingly to the barrel and machined so that, at the operating temperature of the reactor, the differential expansion between barrel 18 and vessel 10 applies the barrier 38 to the inner surface of the vessel. To further reduce the flow by-passing the core through a possible gap between the barrier and the internal wall of the vessel, the barrier may include conventional means creating a pressure loss, such as a flow expansion groove machined on the outer face of the barrier or a flexible lip on the barrier having a higher coefficient of expansion than that of barrel 18. The barrier may as well be equipped with segments having straight or shaped elements on the vertical parts and circular elements on the horizontal parts.

Barrier 38 includes circumferential sections placed in a staggered arrangement, some at a level slightly higher than that of pipes 30 and 36 and the others at a slightly lower level. The circumferential sections are connected together by axially directed sections 39 each separating an inlet pipe from an outlet pipe and which give the barrier a "crenelated" shape.

Figure 2A:
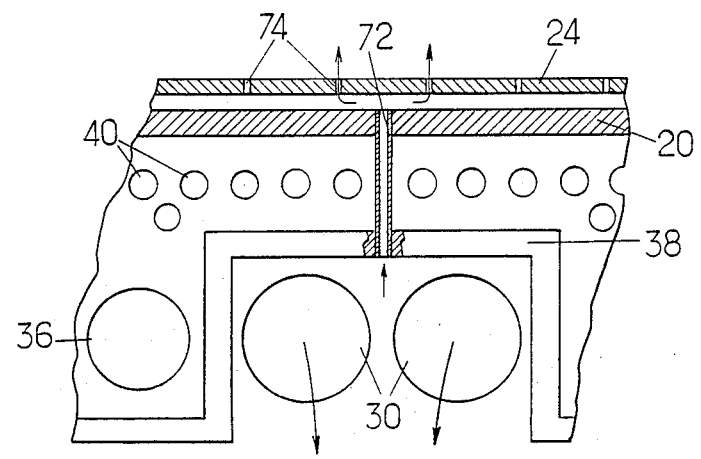

In the modified construction shown in FIG. 2A, a plurality of vertical tubes 72 pass through barrier 38 and flange 20. The tubes open at the top point of the crenelated barrier between two inlet pipes 30. Vertical holes 74 formed at the periphery of the support plate 24 complete a flow path for water flowing from the inlet pipes 30 towards the vessel "roof" defined by plate 24 and cover 12. With such communication, water at the inlet temperature and pressure in the reactor is admitted into the vessel roof and establishes there a pressure greater than that which prevails at the outlet from the core because of the pressure losses in this latter. Consequently, leaks may occur along the path shown with broken lines in FIG. 2 and maintain the vessel roof at a temperature lower than the outlet temperature of the reactor.

In barrel 18 are formed openings for the passage of water from the upper internals to pipes 36. Some of these openings, 40, are of a large diameter and are placed above the level of the upper sections of the barrier 38. Others, 42, have a smaller flow section and are situated below the upper level of the barrier 38, but solely in the angular sectors of the casing which emerge above the barrier. In the angular sectors corresponding to the position of the inlet pipes, openings 40 may have a particularly high diameter for compensating for the absence of openings 42.

The openings 40 and 42 have dimensions and are distributed such that the transverse speed of the flow is low over the greatest part of the height of the cluster guides from the bottom and is only high in the top part, where the cluster guides are firmly held in position by their embedment in the support plate 24. Such a distribution of the hydraulic forces on the guides is favorable in that it reduces the transverse forces on the guide assembly in plate 22 and the risk of vibrations. In FIG. 2, the flow is shown by solid arrows and it can be seen that it only becomes essentially transversal in the top part of guides 26.

Figure 3:
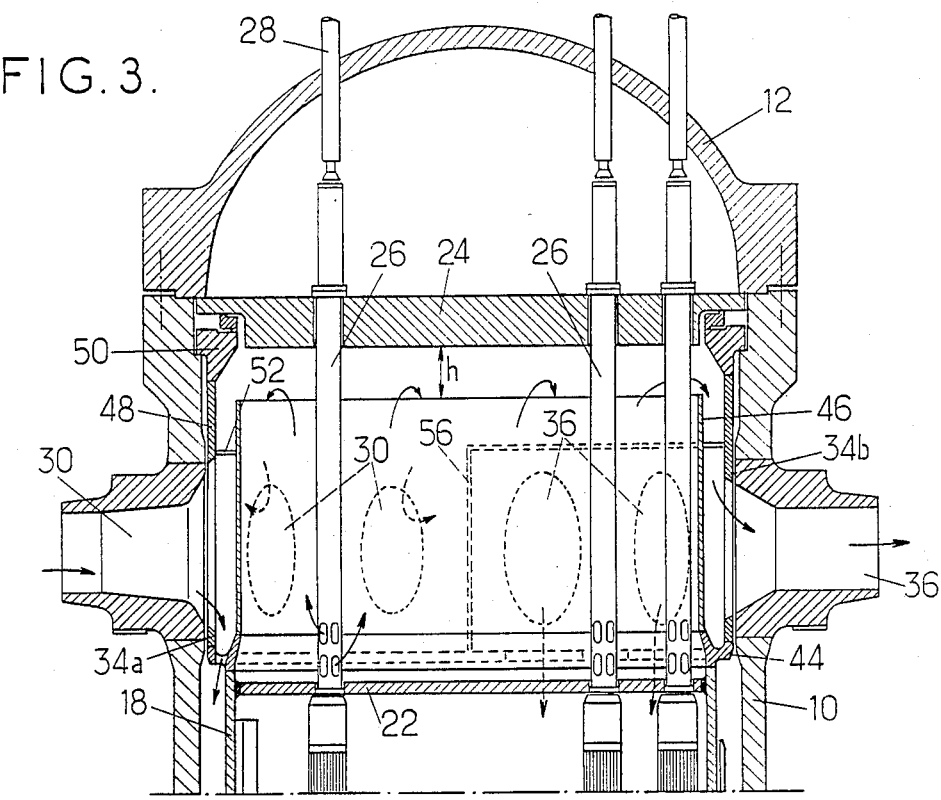

In the constructional variant shown in FIG. 3, an adaptor piece 44 forming a partitioning means is fixed to the core casing 18, at a level slightly lower than that of pipes 30 and 36. On the adaptation piece is welded a first shroud 46 for ensuring an axial flow along the cluster guides, over the greatest part of the length thereof from the bottom. A second shroud, 48, concentric to the first one and surrounding it is also welded to the adaptation piece 44. This second shroud 48 is provided at his upper part with a flange 50 for suspending the assembly formed by shrouds 48 and 46, the adaptation piece 44, casing 18 and the bottom (not shown) of the lower internal equipment.

The partitioning means include, in the case illustrated in FIG. 3, metal plate sections 52 and 56 welded in crenelated form to the shrouds 46 and 48. The annular adaptation piece 44 is pierced with openings in the angular sectors corresponding to the position of the inlet pipes 30. These openings allow the water arriving through pipes 30 to flow down through the annular space defined by the vessel and casing 18. The first shroud 46 has a length such that it leaves a radial water escape gap h between it and the support plate 24.

The second shroud 48 has inlet nozzles 34a and outlet nozzles 34b fulfilling the same role as the nozzles 34 of FIG. 1.

It can be seen that here again the coolant flow, indicated by arrows, only has a component transversal to the cluster guides 26 at the top part of these latter.

Figure 5:
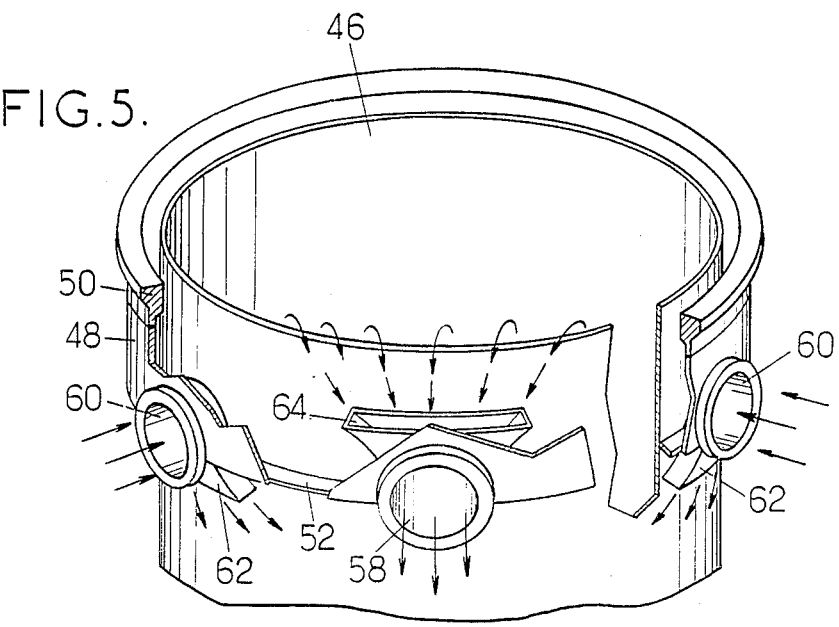
Figure 4:
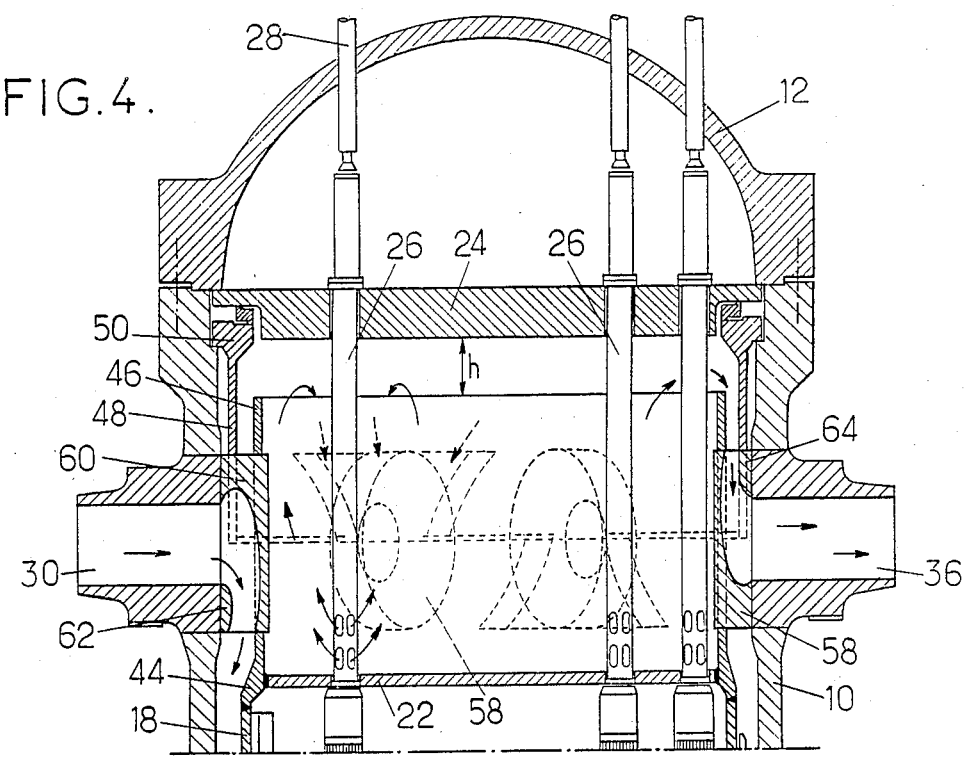

In the constructional variant shown in figures 4 and 5 where the parts already shown are designated by the same reference number, the core casing 18 is again provided with an adaptation piece situated slightly below the level of pipes 30 and 36. This adaptation piece includes a first shroud 46 of a diameter slightly less than that of the casing and of height such that it again leaves an escape clearance h for the coolant. A second shroud 48, welded to the first one, is provided with a suspension flange 50.

Water guides 58 and 60 are embedded in shroud 46 and sealingly welded thereto. Guides 60 and 58 coincide respectively with the inlet 30 and the outlet 30 pipes. They may be formed by hollow pieces, formed by moulding, having a general cylindrical shape with a widening part forming a funnel and directed vertically, i.e. perpendicular to the axis of the cylindrical part. FIG. 5 shows that the funnel 62 associated with guides 60 play a divergent role. The funnels 64 associated with guides 58 on the contrary play a convergent role. The surface of the water guides 58 and 60 which is opposite pipes 36 and 30 is machined and fitted so as to bear against the part of the vessel and to reduce the flow passing round the core when the reactor is at its normal operating temperature.

Figure 6:
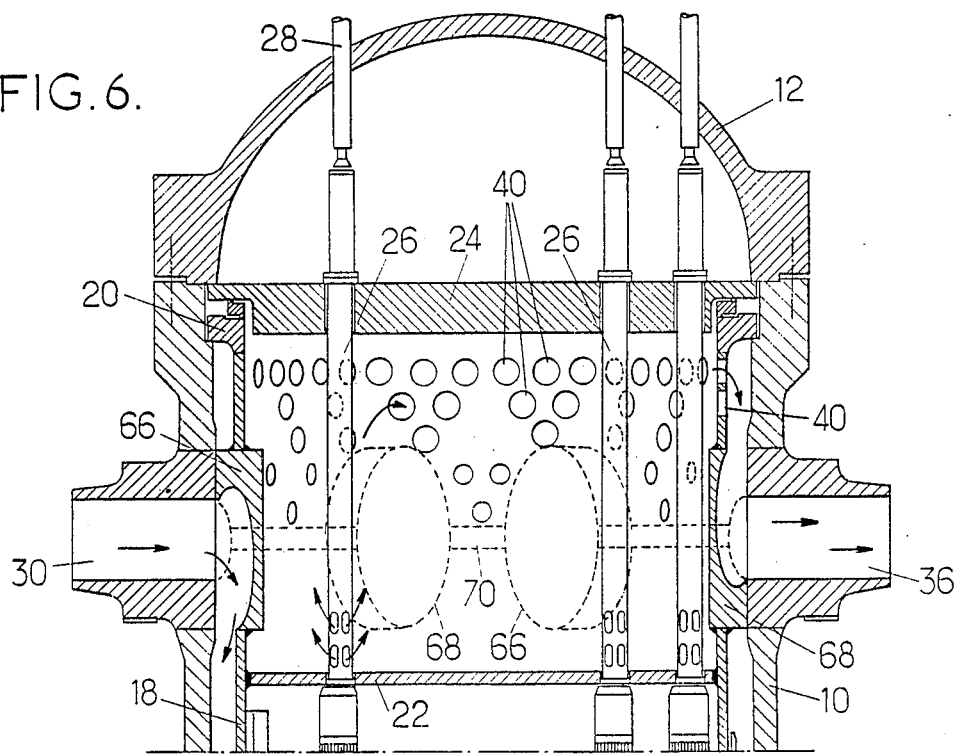

In the variant shown in FIG. 6, the internal equipment has a general construction similar to that shown in FIG. 1, except that water guides 66 and 68 are fitted in openings, at the upper part of casing 18, and are sealingly fixed to the casing. These water guides 66 and 68 face respectively inlet 30 and outlet 36 pipes of the vessel. They are connected together by girdle sections 70. The water guides may be formed by forged parts in the form of scoops having an outwardly turned profiled wall so as to guide downwards the water which penetrates through the inlet pipe 30 and, towards the outlet pipes 36, the water which leaves the upper internal equipment. The girdle sections 70 will generally be welded to the casing, sealing of the separation between the water which enters the reactor and that which leaves being provided when hot by the differential expansion between casing 18 and vessel 10.

As in the case of FIG. 2, casing 18 is pierced at its upper part, with holes 40 for the flow therethrough of water coming from the core and going towards the volumes which communicate with the outlet pipe 36.

Other embodiments of the invention are of course possible relating more particularly to the shape of the dividing walls which may be formed of sections shaped or not, having orientations which may be other than horizontal and vertical.

We claim:

1. A nuclear reactor having:
a pressure resistant vessel;
inlet pipes and outlet pipes all of which open substantially at a same horizontal level into said vessel, for delivery of a pressurized liquid coolant to said vessel and delivery of said coolant out of said vessel, respectively;
a core consisting of fuel assemblies located vertically and side by side within said vessel at a horizontal level lower than said same horizontal level of said inlet and outlet pipes; and
internals located within said vessel, having a barrel supporting the core and defining with said vessel a downward coolant path from the inlet pipes to a space under the core and having upper internals located above the core including an upper extension of said barrel above the core, and defining an outlet flow path for said coolant flowing up out of the core towards said outlet pipes;
wherein said upper internals further include dividing wall means connecting said upper extension of said barrel to said vessel, consisting of first circumferential sections situated at a level higher than the inlet and outlet pipes, second circumferential sections situated at a level lower than said inlet and outlet pipes and sections connecting said circumferential sections and fractionating an annular space between the vessel and said upper extension into angularly distributed first volumes and second volumes alternating around a vertical axis of said vessel, said connecting sections being so located that said first volumes are in communication with said inlet pipes and said downward cooling path while said second volumes are in communication with said outlet pipes, and
wherein said upper extension of said barrel is formed with passage means opening into said second volumes, whereby said outlet flow path impresses flow lines to said coolant which are successively vertical and then bent into a radially outward direction into said second volumes through said passage means.

2. a nuclear reactor according to claim 1,
wherein said upper internals further comprise control cluster guides placed above the core, suspended from a cluster guide support plate located above said upper extension and receiving coolant having respective ones of said fuel assemblies, and
wherein said passage means consist of openings formed in an upper part of said extension above said dividing wall means.

3. A nuclear reactor having:
a pressure resistant vessel;
inlet pipes and outlet pipes all of which open substantially at a same horizontal level into said vessel, for delivery of a pressurized liquid coolant to said vessel and delivery of said coolant out of said vessel, respectively;
a core consisting of fuel assemblies located vertically and side by side within said vessel at a horizontal level lower than said same horizontal level of said inlet and outlet pipes; and
internals located within said vessel, having a barrel supporting the core and defining with said vessel a downward coolant path from the inlet pipes to a space under the core and having upper internals located above the core, including an upper extension of said barrel above the core, and defining an outlet flow path for said coolant flowing up out of the core towards said outlet pipes;

wherein said upper internals further include:
first water guides each carried by said upper extension and each formed with passage means opening radially outwardly into one of said inlet pipes and communicating it with said downward coolant path for directing the coolant flow which arrives through the inlet pipes of the vessel along said downward coolant path, second water guides each carried by said upper extension and each formed with passage means opening radially outwardly into a respective one of said outlet pipes and opening upwardly, and dividing wall means consisting of a plurality of sections each connecting two successive ones of said first and second water guides and separating an annular space defined by said barrel and said extension into a lower volume in communication with said coolant downward path, into which the passage means of said first water guides open, and an upper volume into which said second water guides open, and wherein said extension of said barrel defines additional passage means opening into said upper volume, whereby the flow lines of said coolant in said outlet flow path are successively vertical and bent into a radially outward direction into said second volumes through said passage means.

4. A nuclear reactor according to claim 3, wherein said additional passage means consists of openings formed in said upper extension above the level of said horizontal sections, offering a flow cross-sectional area per unit height which increases from the bottom to the top of said upper extension.

5. A nuclear reactor having:
a pressure resistant vessel;
inlet pipes and outlet pipes all of which open substantially at a same horizontal level into said vessel, for delivery of a pressurized liquid coolant to said vessel and delivery of said coolant out of said vessel, respectively;
a core consisting of fuel assemblies located vertically and side by side within said vessel at a horizontal level lower than said same horizontal level of said inlet and outlet pipes; and
internals located within said vessel, having a barrel supporting the core and defining with said vessel a downward coolant path from the inlet pipes to a space under the core and having upper internals located above the core including an upper extension of said barrel above the core, and defining an outlet flow path for said coolant flowing up out of the core;

wherein said upper internals further comprise a support plate supporting cluster guides receiving coolant flowing out of said core, wherein said upper extension comprises a radially outer shroud in water-tight contact with said vessel about said inlet pipes and outlet pipes and formed with coolant inlet and outlet openings respectively aligned with the inlet and outlet pipes and a radially inner shroud defining a coolant collection space for the coolant flowing out of the core with said cluster guide support plate, said radially inner shroud terminating upwardly at a distance from said support plate, and wherein said upper internals further comprise dividing wall means connecting said radially inner shroud and said radially outer shroud and consisting of first circumferential sections situated at a level higher than the inlet and outlet pipes, second circumferential sections situated at a level lower than said inlet and outlet pipes and sections connecting said circumferential sections and fractionating an annular space between said inner shroud and outer shroud into angularly distributed first volumes and second volumes alternating around a vertical axis of said vessel, said connecting sections being so located that said first volumes are in communication with said inlet pipes and said downward cooling path while said second volumes are in communication with said outlet pipes, whereby said outlet flow path impresses flow lines to said coolant which successively are upwardly directed, radially between said support plate and inner shroud and downwardly between the inner shroud and outer shroud.

6. A nuclear reactor according to claim 3, wherein said upper extension comprises a radially outer shroud arranged for sealing contact with the vessel about the pipes and a radially inner shroud defining, with a cluster guide support plate, a coolant collection space, said water guides projecting into the internal shroud and being provided with funnels for guiding the coolant towards the outlet pipes and for diffusing the water from the inlet pipes and wherein said additional passage means comprise a free space between an upper edge of the internal shroud and a cluster guide support plate.

7. Reactor according to claim 3, wherein the openings at the top part of the upper extension have a larger cross-sectional flow area than the openings placed in the lower part thereof.

8. Reactor according to claim 2, wherein the uppr internals include a cluster guide support plate from which are suspended the cluster guides, and which is situated above the level of the pipes and the upper extension is formed at its upper part with said passage means and sealingly connected to the support plate.

* * * * *